United States Patent [19]

Lairson et al.

[11] Patent Number: 5,822,153
[45] Date of Patent: Oct. 13, 1998

[54] HARD DISK DRIVE HAVING CONTACT WRITE AND RECESSED MAGNETORESTIVE READ HEAD

[75] Inventors: Bruce M. Lairson, Houston, Tex.; Mark A. Lauer, Pleasanton, Calif.

[73] Assignee: Censtor Corp.

[21] Appl. No.: 778,566

[22] Filed: Jan. 3, 1997

[51] Int. Cl.$^6$ .............................. G11B 5/58; G11B 5/39; G11B 5/60

[52] U.S. Cl. ........................... 360/104; 360/103; 360/113

[58] Field of Search .................................... 360/103, 104, 360/113, 122

[56] References Cited

U.S. PATENT DOCUMENTS

| | | | |
|---|---|---|---|
| 4,669,011 | 5/1987 | Lemke | 360/103 |
| 5,041,932 | 8/1991 | Hamilton | 360/103 |
| 5,255,141 | 10/1993 | Valstyn et al. | 360/126 |
| 5,455,730 | 10/1995 | Dovek et al. | 360/113 |

OTHER PUBLICATIONS

C. Tsang et al., IEEE Transactions on Magentics, vol. 25, No. 5, Sep. 1992, pp. 2289–2291. Study of Recessed MR Sensors with Unlaminated and Multi–Laminated Flux–Guides.

Primary Examiner—Robert S. Tupper
Attorney, Agent, or Firm—Mark Lauer

[57] ABSTRACT

A hard disk drive has a head with a read element adjacent to a write element, with the write element extending closer to the disk than the read element so that the write element is close to the disk for writing sharp patterns and the read element is removed from the disk to avoid wear and thermal asperities. The write element is encompassed with diamond-like carbon (DLC) to allow at least occasional dynamic contact with the disk while the read element, which includes a magneto resistive material, is disposed in a recessed area and may be covered with a thin coating of DLC to avert corrosion. The disk may have a multilayer granular media for low-noise, high-strength perpendicular data storage. Perpendicular data storage may also be provided by keeping the write element in such close proximity to the media that perpendicular write fields predominate, while perpendicular signals from the media are favored by the read element.

28 Claims, 5 Drawing Sheets

HARD DISK DRIVE HAVING CONTACT WRITE AND RECESSED MAGNETORESTIVE READ HEAD

TECHNICAL FIELD

The present invention relates to information storage systems and in particular to electromagnetic transducers for hard disk drives.

BACKGROUND OF THE INVENTION

Traditional electromagnetic data storage transducers employ a magnetically permeable core coupled with a conductive coil in order to write and read data in an associated magnetic recording surface. In a hard disk drive, such transducers are usually spaced from the rapidly spinning rigid disk by a thin layer of air that moves with the disk surface, often termed an air bearing. This spacing is believed to be important in avoiding damage between the rapidly spinning disk and the transducer, which is appended to a substrate designed to "fly" slightly above the disk surface, buoyed by the moving air layer. This spacing or fly height, however, limits the density with which data can be stored and lowers the resolution and amplitude with which data can be retrieved. In recent years, durable sliding contact operation has been achieved which removes the air layer spacing and thereby enhances resolution, as disclosed in commonly assigned U.S. Pat. No. 5,041,932 to Hamilton.

Writing is typically performed by applying a current to the coil so that a magnetic field is induced in the adjacent magnetically permeable core, with the core transmitting a magnetic signal across any spacing and protective coating of the disk to magnetize a tiny pattern, or digital bit, of the media layer within the disk. Reading of information in the disk may be performed by sensing the change in magnetic field of the core as the transducer passes over the bits in the disk, the changing magnetic field inducing a voltage or current in the inductively coupled coil. Alternatively, reading of the information may be accomplished by the employment of a magneto resistive (MR) sensor, which has a resistance that varies as a function of the magnetic field adjacent to the sensor. In order to increase the amplitude and resolution in reading the bits, the MR sensor is typically positioned on the slider as close to the disk as possible.

Such a conventional anisotropic magneto resistive (AMR) sensor is formed of a very thin film with an edge facing and designed to be aligned with the recorded bits, and is subject to deleterious influences other than the magnetic field of the nearby bits. For instance, as little as ten millionths of an inch of wear of the sensor due to occasional contact with the disk is enough to cause most currently available, high-density MR hard disk drives to fail. More sensitive magnetoresistive sensors, such as spin valve (SV), giant magnetoresistive (GMR) and colossal magnetoresistive (CMR) sensors, employ even thinner films and are even more susceptible to problems with imperfections. Moreover, fluctuations in the temperature of the sensor can cause changes in resistance that may be confused with magnetic signals. In particular, even occasional contact between the transducer and the disk is known to result in such thermal fluctuations.

Differing approaches have been used to avoid such thermal asperities. In U.S. Pat. No. 5,255,141, Valstyn et al. remove an MR or Hall effect sensor from the disk-facing surface of a flying head by utilizing a shunt that is switched to allow sufficient signals for both writing and reading. On the other hand, U.S. Pat. No. 5,455,730 to Dovek et al. employs a thick lubricant and a step to maintain separation between a disk and an inductive-writing, MR-reading transducer, and uses electronic manipulation to filter out magnetic signals from thermal noise. In order to achieve sufficient signal strength for an MR sensor that is removed from a disk, flux guides are commonly employed. In a STUDY OF RECESSED MR SENSORS WITH UNLAMINATED AND MULTI-LAMINATED FLUX GUIDES, IEEE Transactions on Magnetics, Vol. 28, No. 5, Sep., 1992, C. Tang et al. teach that it is important to have such a magnetically permeable path between bits on the disk and the MR sensor in order to reduce spacing losses.

An object of the present invention was to provide extremely high signal resolution in a hard disk drive system by designing a transducer to combine dynamic contact operation and MR sensing while keeping the wear and thermal noise from such contact from destroying the transducer or overwhelming the signal resolution.

SUMMARY OF THE INVENTION

The above object is achieved in a hard disk drive system employing a head with a disk-facing surface that has adjacent first and second areas with the second area being recessed relative to the first, the first area containing a writing element and the second area containing a reading element, so that the write element is in close proximity to the spinning disk for writing sharp patterns to the disk, while the read element is spaced apart from the disk in order to avoid wear and thermal spikes that may otherwise be caused by dynamic contact with the disk. The read element is an MR sensor, which is defined in this application to include anisotropic magnetoresistive (AMR), spin-valve (SV), giant magnetoresistive (GMR) and colossal magnetoresistive (CMR) effect sensors.

The first area may be located on a protrusion which contacts the disk and separates most of the disk-facing surface of the head from the disk, in order to reduce aerodynamic lift on the head and to provide durable, low-force contact with the disk despite the air layer that accompanies the rapidly spinning disk. Alternatively, the write element may be positioned near a trailing end of an air bearing rail that flies so close to the disk so as to be in at least occasional dynamic contact with the disk, with the read element disposed in a recess adjacent to that trailing end. The close proximity between the write element and the disk provides intense, sharply defined write fields to the media of the disk for high density, high signal strength, low noise data storage. This high signal-to-noise ratio data storage allows an MR sensor to be positioned away from the disk without the need for a flux guide. Moreover, dynamic contact of the write element affords a substantially constant spacing between the MR sensor and the disk, helping to control signal variations.

For a well formed write head the gradient of the write field increases in inverse proportion to the separation between the write element and the recording medium. Deleterious effects in the medium, such as magnetostatic interference while writing adjacent transitions (nonlinear transition shift) and noise associated with differing coercivities at different locations in the medium, are reduced as the write field gradient is increased. Thus the quality of the written pattern increases dramatically as the writer is moved closer to the written medium. The read transducer resolution is largely limited by the spacing between the shields surrounding the MR sensor, so relatively little improvement in resolution occurs as the read element is moved closer to the medium. Thus the present invention increases the resolution of the writing process without decreasing the resolution of the reading process.

In contrast to conventional drive systems, the head preferably stores data in a perpendicular mode on the disk, and reads the data from the perpendicularly magnetized bits on the disk. The media layer of disk preferably has high perpendicular anisotropy, high coercivity and low noise, enhancing the resolution of the sensor. Due to the close proximity between the writing pole tips and the media of the disk, perpendicular write fields predominate, favoring perpendicular data storage in the disk. The perpendicularly magnetized bits in turn produce a much greater magnetic signal for reading by the aligned MR sensor than the perpendicular offshoot fields of a longitudinally magnetized disk. This increased signal from the medium provides support for an MR sensor which is separated from the disk by a thermally insulative gas rather than a flux guided, thermally conductive solid, reducing thermal spikes generated by contact with the disk.

Thermal asperities felt by the read element due to contact between the head and the disk are reduced monotonically for an homogeneous material as the point of contact is moved away from the read element, due to the heat capacity of the intervening material, which reduces the amplitude of the temperature rise of each asperity. In addition, the increased distance reduces the frequency bandwidth over which the asperity occurs, due to the increased time required for the temperature rise to reach the sensor. In the present invention, the thermally conductive layers of the writing element also tend to divert thermal spikes in a direction perpendicular to the disk, rather than toward the sensor. A further reduction in thermal asperities is accomplished with the formation of thermally insulative layers between the point of contact and the read element.

DETAILED DESCRIPTION OF THE PREFERRED EMBODIMENTS

Figure 1:
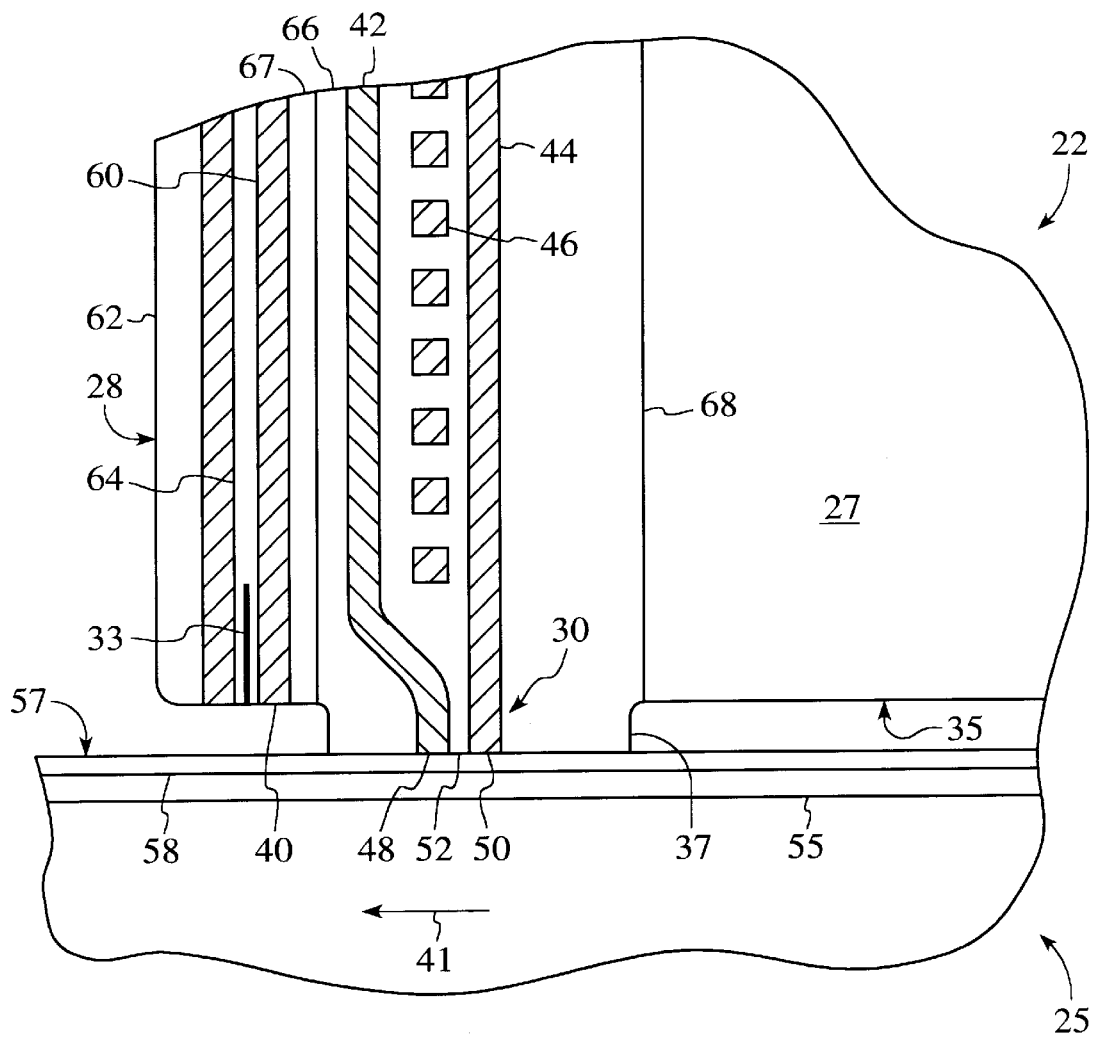
FIG. 1 is a cross-sectional view of a transducing portion of a head in read-write operation on a spinning disk, with a read element recessed from and downstream of a write element.

Referring now to FIG. 1, a trailing portion of a head 22 is shown in operation on a spinning disk 25. The head 22 includes a substrate die 27 and a trailing end 28, between which a write element 30 and a read element 33 are formed. The read element is an MR sensor, which as noted above is defined to be an AMR, SV, GMR or CMR sensor. A disk-facing surface 35 of the head 22 has a protrusion 37 encompassing the write element 30 and a recess 40 adjacent to the read element 33. The disk is spinning relative to the head in a direction shown by arrow 41, typically at several thousand RPM. The protrusion 37 causes the writing element 30 to be in virtual contact with the disk 25 for writing sharp magnetic bits while most of the disk-facing surface 35 is removed from the disk, thereby reducing lift from the air or gas layer that accompanies the rapidly spinning disk, so that low inertial and load forces are applied for reducing wear and avoiding head crash from dynamic contact. The high write field gradients provided by contact or near contact operation allow the MR sensor 33 to be removed from the disk 25 for avoiding noise and harm, yet still receive sufficient signal from the disk without the need for a flux guide.

The write element 30 is formed as a terminal of two magnetically permeable layers 42 and 44 which surround a section of an electrically conductive coil layer 46. The layers 42 and 44 taper together adjacent to the disk 25 to form a pair of pole tips 48 and 50 which are separated by a sub micron a magnetic gap 52. Although not shown, the layers 42 and 44 are pinched together distal to the disk to form a magnetic circuit around which magnetic flux flows when induced by an electrical current in the coil 46. The amagnetic gap 52 between pole tips 48 and 50 causes some flux to travel through and thereby magnetize a media layer 55 of the disk 25. Note that the horizontal and vertical components of FIG. 1 are dramatically out of scale in order to facilitate appreciation of the difference in elevation between the write and read elements that is characteristic of the present invention.

Due to the close proximity between the pole tips 48 and 50 and the media layer 55, strong and sharply defined magnetic fields emanating from the pole tips magnetize the media with similarly strong and sharp magnetic bits. The pole tips 48 and 50 are preferably close enough to the media that perpendicular write fields predominate. In keeping with this preference for perpendicular recording, the media layer 55 in this embodiment has an easy axis of magnetization substantially perpendicular to a surface 57 of the disk 25, with a hard carbon-based overcoat 58 separating the head from the media. In order for perpendicular fields to predominate, the distance between the pole tips and the media must generally be a small fraction of the spacing between pole tips, which is accomplished in the embodiment shown with a gap 52 of about 2,000 Å and an overcoat 58 and media layer 55 each about 100 Å in thickness. The media layer 55 may be composed of a stack of thin films alternating between primarily cobalt-chrome films and noble metal such as platinum films, with crystalline grains transcending the films for reduced intermagnetic coupling, as disclosed in co-pending U.S. pat. app. Ser. No. 08/607,003, which is hereby incorporated by reference.

The MR sensor 33 in simplest (AMR) form is a thin (100 Å–300 Å thick) layer formed of permalloy ($Ni_{0.8}Fe_{0.2}$) or other known magnetoresistive materials sandwiched between a pair of magnetic shield layers 60 and 62. Note that the MR sensor 33 as well as the shield layers 60 and 62 are exposed on the disk-facing surface 35, but are guaranteed not to contact the disk and damage the sensor and signal reception, due to the spacing provided by the protrusion 37. The sensor 33 is separated from the shield layers 60 and 62 in this embodiment by a pair of nonconductive, a magnetic layers such as alumina, silicon, silicon dioxide or carbon that combine to form spacer layer 64. Alternatively, the shields 60 and 62 may optionally contact the sensor 33 to provide electrical leads for the situation in which the sensor is of the SV, GMR or CMR variety. Surrounding the yoke layers 42 and 44 are layers 66 and 68 of diamond-like carbon (DLC), a solid mixture of carbon, nitrocarbon and hydrocarbon molecules, which extend to form the protrusion 37, encasing the write element 30 with durable material for contacting the disk. A thermally insulative alumina layer 67 is interposed between the DLC layer 66 and the shield 60 to further protect the sensor 33 from thermal asperities generated in the protrusion 37.

Figure 2:
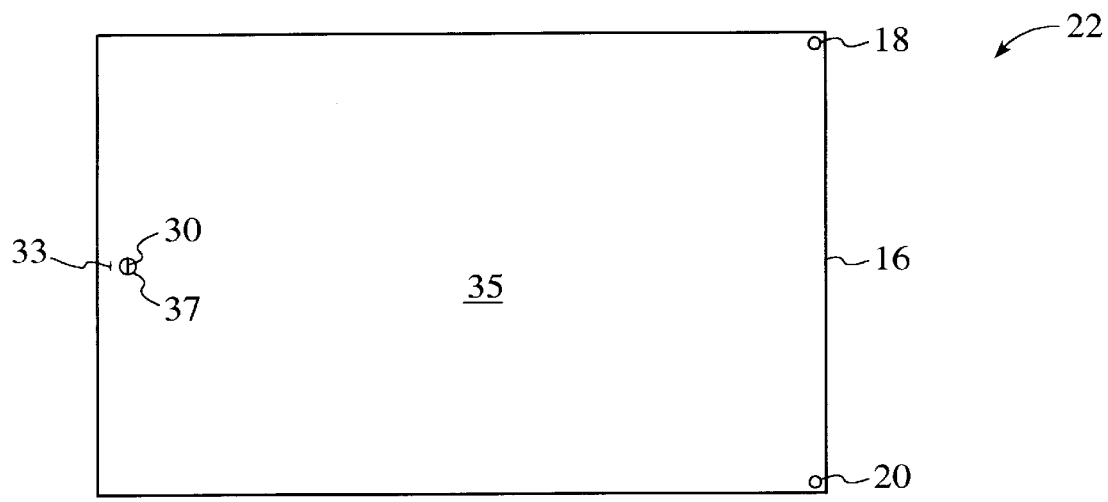
FIG. 2 is a view of a disk-facing surface of the head of FIG. 1.

FIG. 2 depicts the disk-facing surface 35 of the head 22 of FIG. 1. Note that the disk-facing surface 35 includes a pair of pads 18 and 20 for contacting the disk in addition to protrusion 37. The pads 18 and 20 are formed of DLC which is formed on an opposite side of the wafer substrate from the read and write elements 33 and 30. After the head 22 has been diced from the wafer, the topography of the disk-facing surface is formed by removal by ion beam etching (IBE) or other like technique, since the DLC is generally impervious to chemical or chemical/mechanical etching, while the protrusion 37 and pads 18 and 20 are protected from removal by masks or the like. One should note that the head 22 of this embodiment may be operated with the read and write elements 33 and 30 located at a leading rather than trailing end, relative to the spinning disk, so that pads 18 and 20 are adjacent to a trailing end 16.

Figure 3:
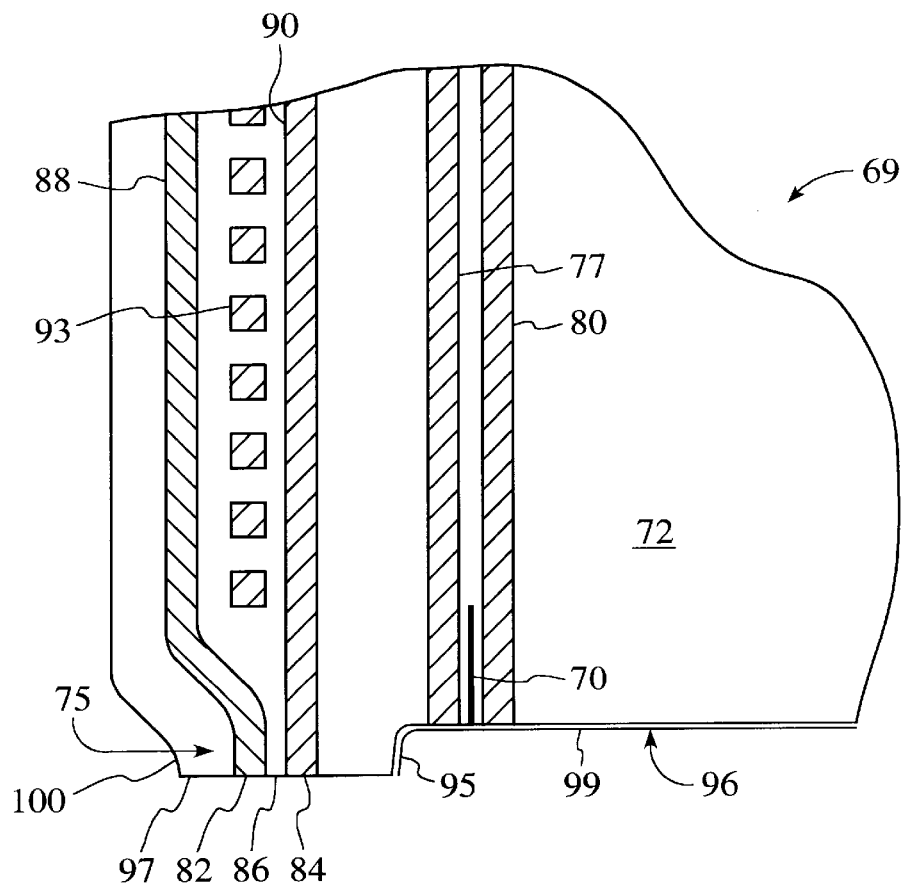
FIG. 3 is a cross-sectional view of a transducing portion of a head in read-write operation on a spinning disk, with a read element recessed from and upstream of a write element.

FIG. 3 shows a head 69 much like that shown in FIG. 1 except for having a read element 70 closer to a substrate die 72 than a write element 75. As before, a pair of magnetic shields 77 and 80 are located on both sides of the read element 70, which is an MR sensor electrically isolated from the shields. Although isolated from the shields 70 and 80, the MR layer 70 is connected to an electrical circuit, not shown in this cross-section, that measures a change in resistance of the layer 70 in response to a change in magnetic field of the layer which, due to the shields 77 and 80, must emanate from a direction generally aligned with the layer 70. Note that for the case in which the sensor is an SV, GMR or CMR type, the shields 77 and 80 may contact the sensor and serve as electrical leads as well as magnetic shields for the sensor. Also as before, the write element is formed of a pair of pole tips 82 and 84 which are separated by an a magnetic gap 86, the pole tips acting as terminals of magnetically permeable yoke layers 88 and 90 which form a write circuit which is activated by an electrical current in coil layer 93.

A very thin (50 Å–500 Å) layer 95 of DLC is optionally deposited on the head 69 to form a disk-facing surface 96 and protect the read element 70. Note that in keeping with the major theme of the present invention, the write element 75 is disposed adjacent to a first area 97 of the surface 96 and the read element is disposed adjacent to a second area 99 of the surface, with the second area recessed relative to the first area. The first area 99 can be seen to be located at an end of a protrusion 100 containing the write element 75. Layer 95 does not cover write element 75 either due to masking during formation of the layer 95 or due to wear during operation. Note that a similar thin DLC layer may cover the disk-facing surface 35 of the embodiment shown in FIG. 1.

Figure 4:
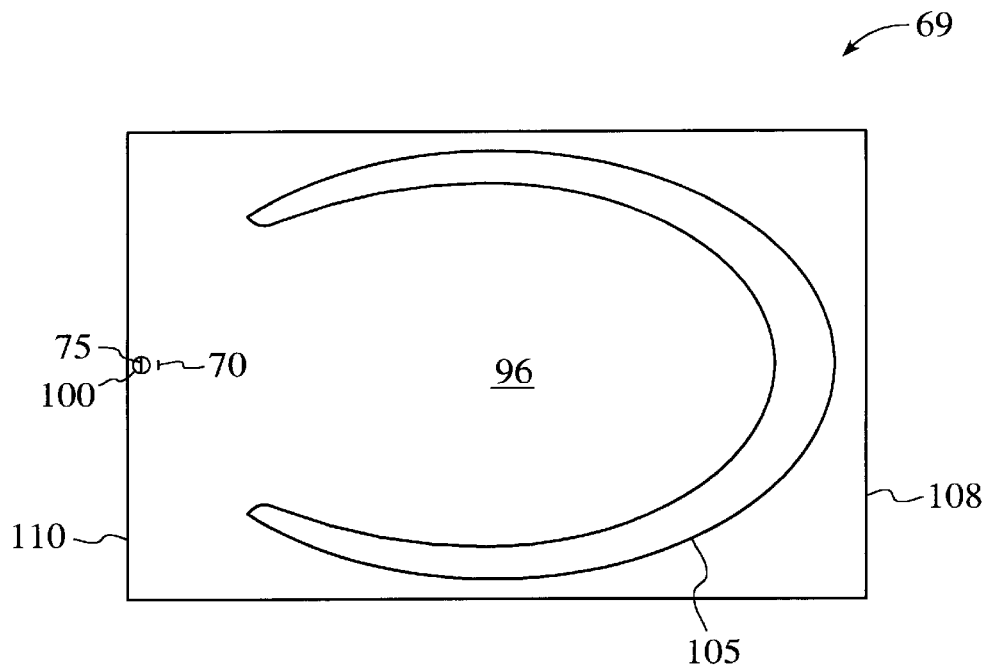
FIG. 4 is a view of a disk-facing surface of the head of FIG. 3.

FIG. 4 offers a view of the disk-facing surface 96 of the head 69 that shows an air-bearing bearing rail 105 which has been coated with the DLC layer 95 shown in FIG. 3. The rail 105 is designed to keep a leading end 108 of the head spaced slightly from a disk during operation, while adjacent to a trailing end 110, the protrusion 100 containing the write element 75 is in ultralight dynamic contact with the disk. Note that the read and write elements 33 and 30 of the head of FIG. 1 may have an air bearing design such as shown in FIG. 4 instead of the tripad design of FIG. 2.

Figure 5:
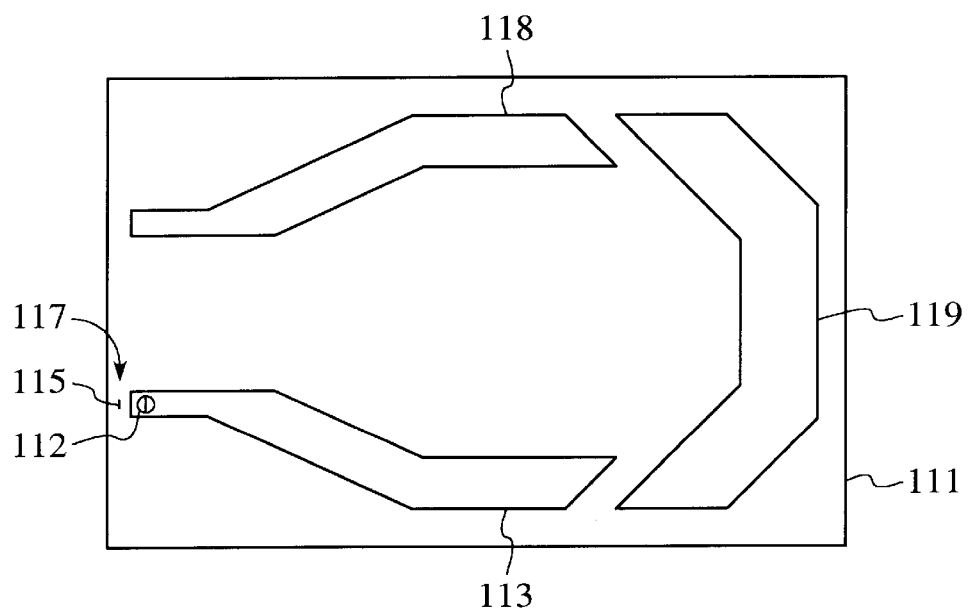
FIG. 5 is a view of a disk-facing surface of a head having a write element disposed in a trailing end of a side rail.

In the head 111 shown in FIG. 5, a write element 112 is located in a trailing end of a mostly air-bearing rail 113, with a read element 115 disposed in a notch 117 between the rail and the trailing end of the head. Note that similar write and read elements may be disposed adjacent to a trailing end of rail 118 for use with an opposite disk surface. The head 111 also has an air bearing front rail 119 which helps the head to operate at a slight tilt to the disk surface so that the trailing ends of rails 113 and 118 are closest to the disk surface, maintaining a height generally of about one micro inch or less. Due to the primarily flying nature of this head 111, the write element 112 may protrude as little as 50 Å compared to the read element, although the slight wear experienced by the trailing end of rail 113 makes it preferable for the elevation difference to be at least 100 Å in order to ensure that an appreciable elevation difference exists over the life of the drive.

Figure 6:
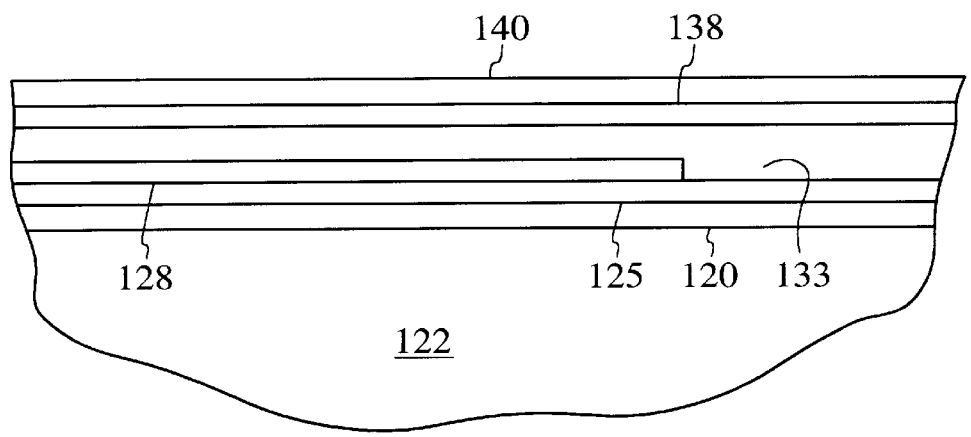
FIG. 6 is a cross-sectional view of a some steps in the formation of the head of FIG. 3.
Figure 7:
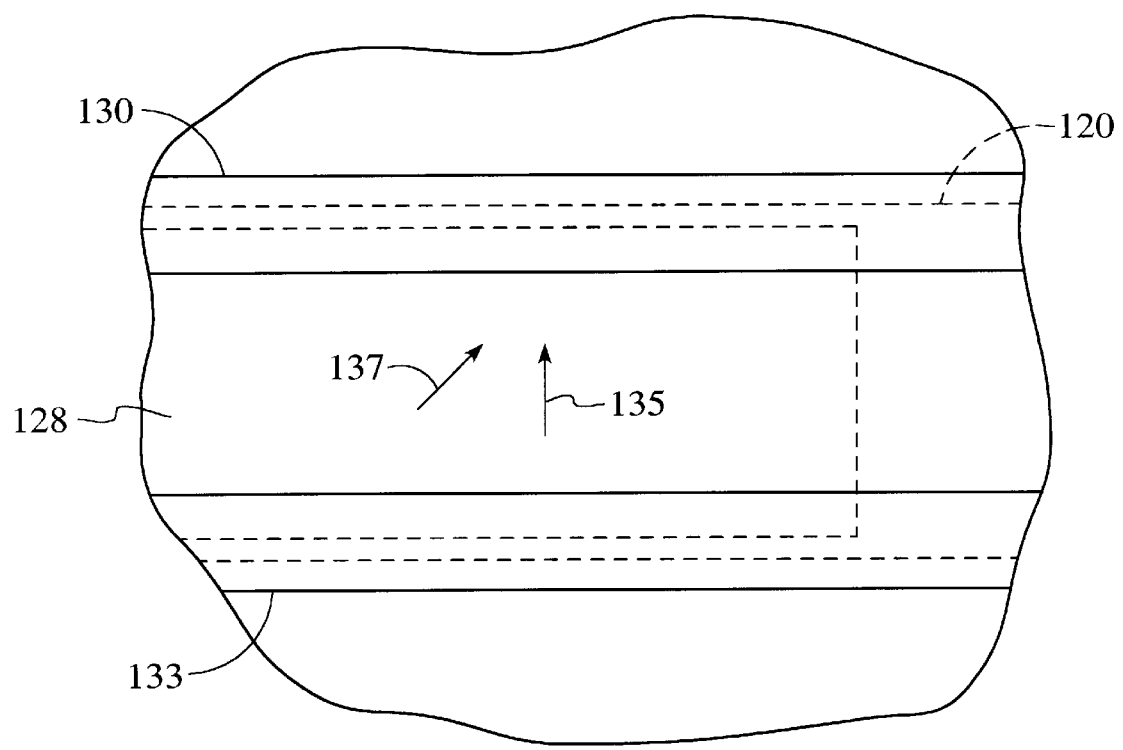
FIG. 7 is a top view of some of the steps of FIG. 5.

FIG. 6 and FIG. 7 show some initial steps in the formation of a protruding-write, recessed-read head of the current invention, beginning with the formation of a first permalloy shield layer 120 on a wafer substrate 122 composed of AlTiC, alumina or other known materials. Although not shown, several thousand such heads may be formed simultaneously on a wafer. The wafer should be polished flat or have an initial layer, not shown, which is deposited and polished. Atop the permalloy shield 120 a thin (50 Å–1000 Å) layer 125 of alumina is deposited, upon which a similarly thin MR layer 128 is formed, which is masked and ion beam etched to form a generally rectangular MR stripe. With most of the stripe 128 masked, a pair of conductive leads 130 and 133 are formed which in operation will provide electrical current through the stripe 128 in a direction shown by arrow 135, as the leads are much more electrically conductive than MR stripe 128. The MR stripe has been formed with a magnetization shown by arrow 137, however, so that a magnetic signal from the media will rotate that magnetization to be either parallel or perpendicular to the electric current, providing a maximum or minimum resistance for distinguishing the signal. Atop the leads 130 and 133 and stripe 128 another a magnetic layer 138 of alumina is formed to isolate those leads and stripe from a second permalloy shield 140.

In FIG. 7, construction of a writing element atop the read structure of FIGS. 5 and 6 is depicted. A thick DLC layer 142 is first formed on the second shield 140, the DLC layer then being polished. A first yoke section 145 is formed by window frame plating or other known techniques. A gap layer 147 of silicon, silicon dioxide, nonconductive silicon carbide, or other known a magnetic materials is then formed to a thickness which will determine that of a gap between pole tips of the write element. An a magnetic layer 149 of alumina may then optionally be formed, atop of which a coil layer 150 is then formed by through plating or other common techniques. A layer of alumina 152 is then formed on and about the coil layer 150, the alumina layer then being planarized by lapping. A mask, not shown, is then patterned to cover the portion of the alumina layer 152 above the coils, so that an isotropic etch then creates the sloping side 153 of layer 152. On top of the etched alumina layer 152 a second yoke section 155 is formed, and then another thick DLC layer 158 is formed so that the yoke sections 145 and 155 are encased in DLC.

Another DLC layer is formed on an opposite side of the wafer substrate for the embodiments having small contact pads spaced near opposite ends of the disk-facing surface from the read and write elements, provided that this step hasn't occurred prior to the formation of those elements. The wafer 122 is then diced into individual heads and the disk-facing surface of the heads are lapped to determine the throat height of the write element. The heads may be individually lapped or grouped into rows or stacked in an array on a palate for this throat height step, with care taken to avoid recession of the pole tips relative to the surrounding material.

With the heads stacked in a planar array on a palate, the topography of the diskfacing surface is then formed by IBE with the DLC layers 142 and 153, yoke layers 145 and 155, and gap layer 147 masked to form the write protrusion, along with any other desired protrusions such as pads 18 and 20 of FIG. 2 or rail 105 of FIG. 4. Note that traditional etching or chemical/mechanical polishing is not suited for defining the disk-facing surface since differential etch or wear rates of these processes do not typically result in having the write element generally coplanar with the highest elevation while the read element is substantially recessed. At this point the disk-facing surface is coated with a thin DLC layer to protect the MR stripe 128 from corrosion, the protrusions being masked during this coating except for any air-bearing rails such as rail 105 of FIG. 4. The difference in the disk-facing surface elevation between the write area and the read area is between 50 Å and 1000 Å, and is preferably less than about 500 Å, although one should note that the read area may include a sloping surface. Testing of the differing elevations of the write and read areas can be accomplished with a Dimension Metrology Scanner as disclosed by K. Babcock and P. Hopkins in the article entitled, "Measuring Poletip Recession With Atomic Force Microscopy," *Idema Insight*, January/February 1997, which is hereby incorporated by reference.

Figure 8:
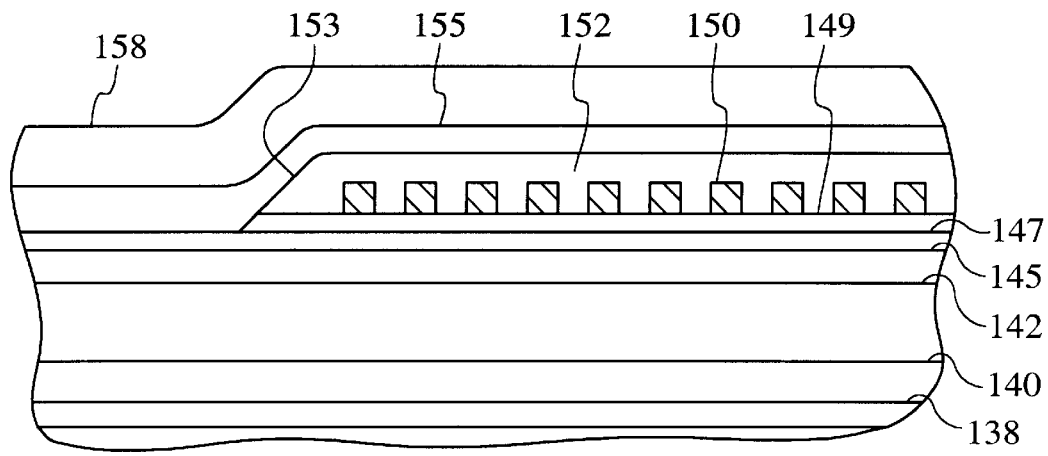
FIG. 8 is a cross-sectional view of a some steps in the formation of the head of FIG. 3 subsequent to the steps shown in FIG. 7.
Figure 9:
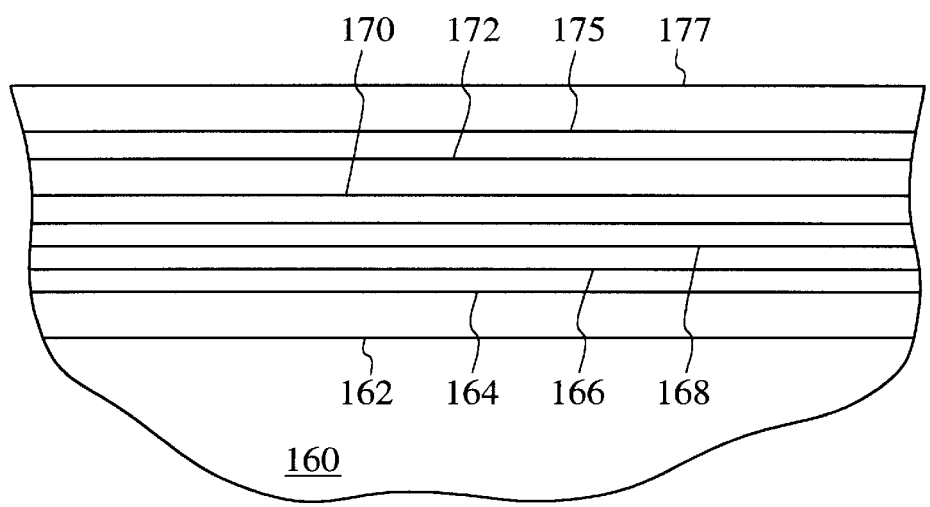
FIG. 9 is a cross-sectional view of some steps in the formation of the a spin-valve sensor of FIG. 3.

Referring now to FIG. 8, the formation of a spin-valve, GMR-effect read element is shown. Atop a wafer substrate 160, a first permalloy shield 162 is formed, atop of which a pinning layer 164 of an anti ferromagnetic material such as FeMn is formed to a thickness of about 100 Å. A very thin (approximately 22 Å thick) ferromagnetic layer 166 of hard magnetic material such as cobalt is then formed, after which a similarly thin (approximately 25 Å thick) conductive spacer layer 168 of a material such as copper is formed. A thicker (approximately 100 Å thick) layer 170 of permalloy is then formed with a magnetization similar to that shown for MR stripe 128 of FIG. 6. A pair of conductive leads are formed, of which only lead 172 is shown in FIG. 8 but which are similar to those shown in FIG. 5 as leads 130 and 133. At this point an IBE is used to make layers 164, 166, 168, 170 and 172 into stripes having a disk-facing length generally equal to that of a track-width of a disk. An alumina spacer layer 175 is then formed, followed by a second permalloy shield 177, to complete the wafer-level construction of the read element. The construction of the write element encased in DLC proceeds as described above and so will not be repeated for the sake of brevity. One should note, however, that the read element can be constructed after rather than before the write element, so that the read element is closer to an end of the head.

We claim:

1. A head for reading and writing information on an associated storage medium of a hard disk drive system, the head comprising:

a microscopic body having a disk-facing surface with first and second areas of different elevation, with said first area including a highest portion of said surface, wherein said body includes a write element exposed on said first area and a magnetic-signal-sensing read element adjoining said second area and separated from said first area, such that said write element is closer than said read element to the medium.

2. The head of claim 1 wherein said body has a leading end and a trailing end, with said read element and said write element disposed adjacent to said trailing end, and said read element being located closer than said write element to said trailing end.

3. The head of claim 1 wherein said body has a leading end and a trailing end, with said read element and said write element disposed adjacent to said trailing end, and said write element being located closer than said read element to said trailing end.

4. The head of claim 1 wherein said body has a leading end and a trailing end, with said read element and said write element disposed adjacent to said leading end, and said read element being located closer than said write element to said leading end.

5. The head of claim 1 wherein said body has a leading end and a trailing end, with said read element and said write element disposed adjacent to said leading end, and said write element being located closer than said read element to said leading end.

6. The head of claim 1 wherein said body has a leading end and a trailing end, and said second area is shaped generally as a notch adjacent to one of said ends.

7. The head of claim 1 wherein said body has a leading end and a trailing end, and said first area is shaped generally as a plateau separated from both said ends.

8. The head of claim 1 wherein said read element is contained within said second area.

9. The head of claim 1 wherein a portion of said read element is exposed on said second area.

10. The head of claim 1 wherein a difference in elevation between said first and second areas is in a range between approximately 50 Å and 500 Å.

11. The head of claim 1 wherein said read element includes a magnetoresistive material.

12. The head of claim 1 wherein said read element includes a spin valve.

13. A head for reading and writing information on an associated storage medium of a hard disk drive system, the head comprising:

a microscopic body having a disk-facing surface with first and second areas, said first area protruding compared to said second area and including a disk-contacting portion, a write transducer disposed in said body and including a core of magnetically permeable material coupled in a loop having a pair of pole tips which are exposed on said first area, and a read transducer disposed in said body and including a magnetoresistive read transducer separated from said first area and adjoining said second area, with said sensor located further than said pole tips from the medium.

14. The head of claim 13 wherein said second area is recessed compared to said first area by a distance in a range between 50 Å and 1000 Å.

15. The head of claim 13 wherein said read transducer is separated from said second area by a protective film.

16. The head of claim 13 wherein said write transducer is encased in diamond-like carbon.

17. The head of claim 13 wherein said read transducer includes a giant magnetoresistive element.

18. The head of claim 13 wherein said read transducer includes a spin valve element.

19. The head of claim 13 wherein said first area is an air bearing rail.

20. A hard disk drive system comprising:

a rigid disk including a magnetic media layer, and a head including a read circuit and write circuit, said read and write circuits each having a transducing gap disposed adjacent to said disk, with said read circuit transducing gap being spaced about 50 Å to 1000 Å further from said disk than said write circuit transducing gap.

21. The system of claim 20 wherein said disk has a surface adjacent to said head and said media layer has an easy axis of magnetization mostly perpendicular to said surface.

22. The system of claim 20 wherein said write circuit transducing gap at least occasionally contacts said disk amid signal transmission between said head and said media with said read circuit transducing gap being separated from said disk by a thermally insulative gas.

23. The system of claim 20 wherein said read circuit transducing gap contains a magnetoresistive element.

24. The system of claim 20 wherein said read circuit transducing gap contains a spin valve element.

25. The system of claim 20 wherein said write circuit transducing gap encounters a portion of said disk ahead of said read circuit transducing gap.

26. The system of claim 20 wherein said read circuit transducing gap encounters a portion of said disk ahead of said write circuit transducing gap.

27. The system of claim 20 wherein said write circuit transducing gap contains a layer which is generally disposed substantially perpendicular to said media.

28. The system of claim 20 wherein said read circuit transducing gap contains a layer which is generally disposed substantially perpendicular to said media.

\* \* \* \* \*